United States Patent [19]

Lee

[11] Patent Number: 5,550,874
[45] Date of Patent: Aug. 27, 1996

[54] CLOCK SYNCHRONIZING CIRCUIT OF DATA TRANSMISSION SYSTEM

[75] Inventor: Sim-Ho Lee, Kyongki-do, Rep. of Korea

[73] Assignee: LG Information & Communications, Ltd., Rep. of Korea

[21] Appl. No.: 519,436

[22] Filed: Aug. 25, 1995

[30] Foreign Application Priority Data

Aug. 26, 1994 [KR] Rep. of Korea .................. 94-21190

[51] Int. Cl.$^6$ ........................................... H04L 7/00
[52] U.S. Cl. ........................................ 375/354; 375/356
[58] Field of Search ............................ 375/354, 355, 375/371, 356; 370/100.1, 108, 105.3; 327/141, 144, 151, 152, 160

[56] References Cited

U.S. PATENT DOCUMENTS

| | | | |
|---|---|---|---|
| 4,056,851 | 11/1977 | Hovagimyan et al. | 364/900 |
| 4,823,365 | 4/1989 | Loginov | 375/118 |
| 5,051,990 | 9/1991 | Kato | 370/105.3 |
| 5,077,761 | 12/1991 | Tokunaga | 375/118 |
| 5,119,406 | 6/1992 | Kramer | 375/118 |
| 5,291,528 | 3/1994 | Verneer | 375/354 |
| 5,293,409 | 3/1994 | Doornenbal et al. | 375/106 |
| 5,446,766 | 8/1995 | Wrany | 375/354 |

*Primary Examiner*—Stephen Chin
*Assistant Examiner*—Huong Luu
*Attorney, Agent, or Firm*—Cooper & Dunham LLP

[57] ABSTRACT

A clock synchronizing circuit of a data transmission system for synchronizing a serial input data at an input clock with a new system clock at each channel of a receiving station to produce serial output data when transmitting multi-channel data using transmitting lines different from each other in length between data transmission systems distant from each other. This circuit includes a write signal generator for counting the input clock provided from transmitting station to generate write signals of plural bits; enable signal generator for performing a logical AND with the write signals of plural bits generated from the write signal generator to produce a plurality of enable signals; a serial-parallel converter for converting the serial input data into parallel data in response to the plurality of enable signals of the enable signal generator and the input clock; a selecting signal generator for counting the system clock to generate selecting signals of plural bits; a multiplexer for multiplexing the parallel data provided from the serial-parallel converter in response to the selecting signals to produce the serial output data; and D flip-flop for synchronizing the serial output data produced from the multiplexer to the system clock to output the serial output data without glitch.

5 Claims, 4 Drawing Sheets

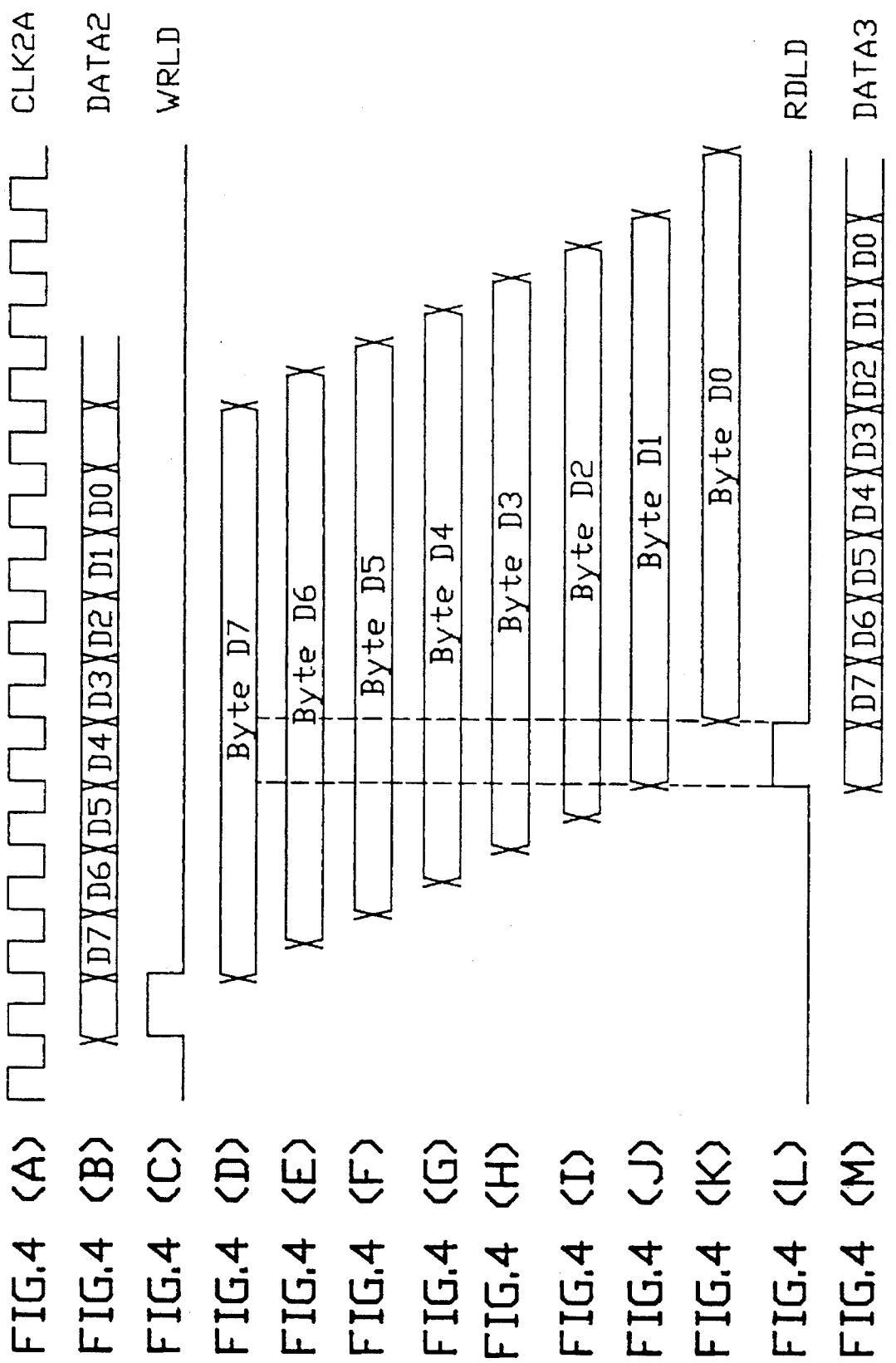

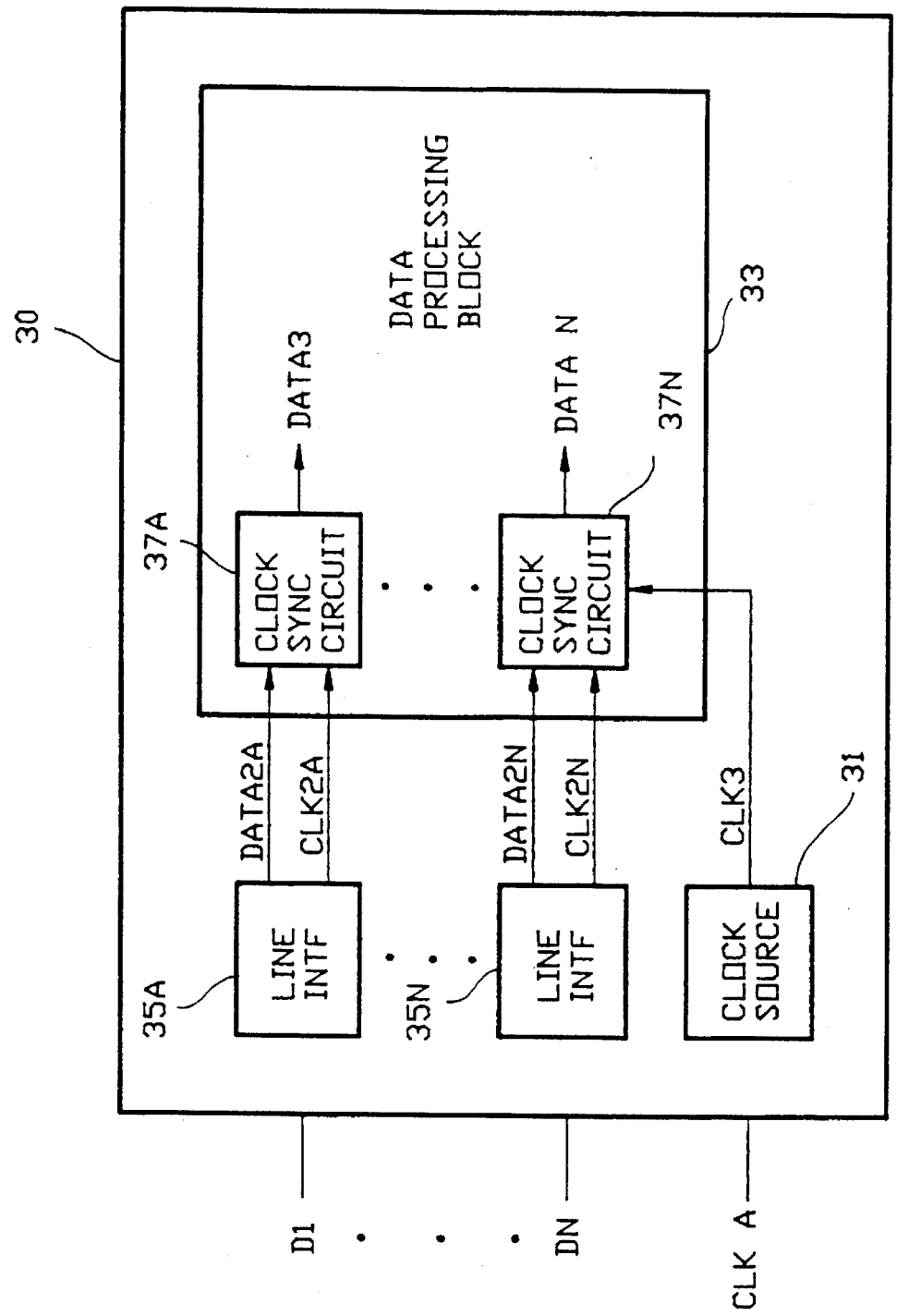

5,550,874

CLOCK SYNCHRONIZING CIRCUIT OF DATA TRANSMISSION SYSTEM

BACKGROUND OF THE INVENTION (1) Field of the Invention

The present invention relates to a clock synchronization of a data transmission system. More particularly, it relates to a clock synchronizing circuit of a data transmission system that can synchronize a clock of the transmitting station to a clock of the receiving station using an elastic buffer in case that there are phase deviations in the clocks of the two systems when transmitting multi-channel data between two data transmission systems distant from each other, using transmission lines different from one another in length between a plurality of sub-systems.

(2) Description of the Prior Art

Referring to FIG. 1, a conventional data transmission system comprises a transmitting station A that transmits data synchronized to an outgoing clock CLKA and a receiving station B receiving data synchronized to an incoming clock CLKB.

In such a data transmission system, the transmitting station A synchronizes outgoing data D1A to D1N to the clock CLKA and serial-transmits the data through each line driver 11A to 11N. The receiving station B then receives the data D1 to DN through each line receiver 13A to 13N, and a data processing block 15 reads incoming data D2A to D2N synchronized to the incoming clock CLKB.

In this conventional data transmission system, the receiving station cannot stably read the data synchronized at the outgoing clock on the basis of the incoming clock where there are the phase differences between the outgoing and incoming clocks. Particularly, since the clock's timing margin is small in high speed data transmission, it cannot ensure that the data synchronized at the transmitting clock is stably read out at the receiving clock.

A clock synchronizing circuit using an elastic buffer disclosed in U.S. Pat. No. 5,293,409 to Mr. Anthony Doornenbal performs simple serial data transmission irrelevant to the frame of transmitted data. The process of reading out the write data may cause undesirable violation of set up time due to the phase deviations of clocks.

SUMMARY OF THE INVENTION

It is an object of the present invention to provide a clock synchronizing circuit of a data transmission system that can synchronize a clock of the transmitting station with a clock of the receiving station using an elastic buffer in case that there establishes frequency synchronization with phase deviations between clocks of the two systems when transmitting data between two data transmission systems distant from each other.

In order to achieve the above object, a clock synchronizing circuit according to the present invention comprises:

a write signal generator for counting input clocks provided from transmitting station and generating write signals of plural bits;

an enable signal generator for performing a logical AND with the write signals of plural bits generated from the write signal generator and producing a plurality of enable signals;

a serial-parallel converter for converting incoming serial data into parallel data in response to the plurality of enable signals of the enable signal generator and input clock;

a selecting signal generator for counting the system clock to generate selecting signals of plural bits;

a multiplexer for multiplexing the parallel data provided from the serial-parallel converter in response to selecting signals of the serial-parallel converter and producing a serial output data; and D flip-flop for synchronizing the serial output data produced from the multiplexer to the system clock and producing the serial output data without glitch.

BRIEF DESCRIPTION OF THE DRAWINGS

FIGS. 4A to 4M are timing diagrams depicting clock synchronizing process of the present invention; and FIG. 5 is a schematic block diagram of a data receiving station according to the present invention.

DETAILED DESCRIPTION OF THE PREFERRED EMBODIMENTS

Reference will now be made in detail to the preferred embodiment of the invention, an example of which is illustrated in the accompanying drawings. Wherever possible, the same reference numbers will be used throughout the drawings to refer to the same or like parts.

Figure 1:
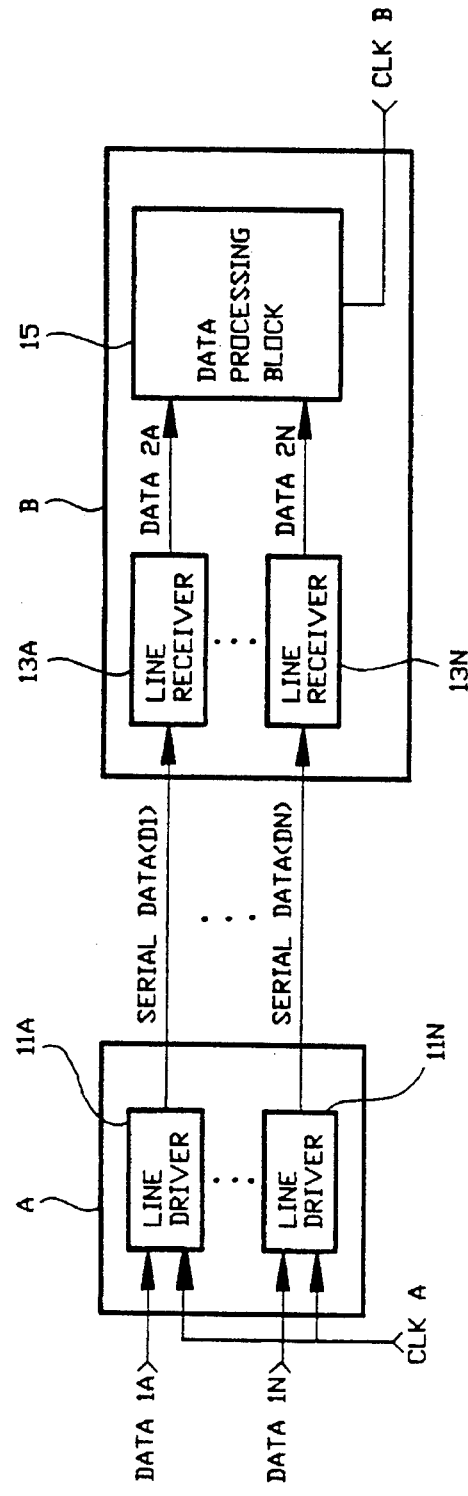
FIG. 1 is a schematic block diagram of a conventional data transmission system.
Figure 2:
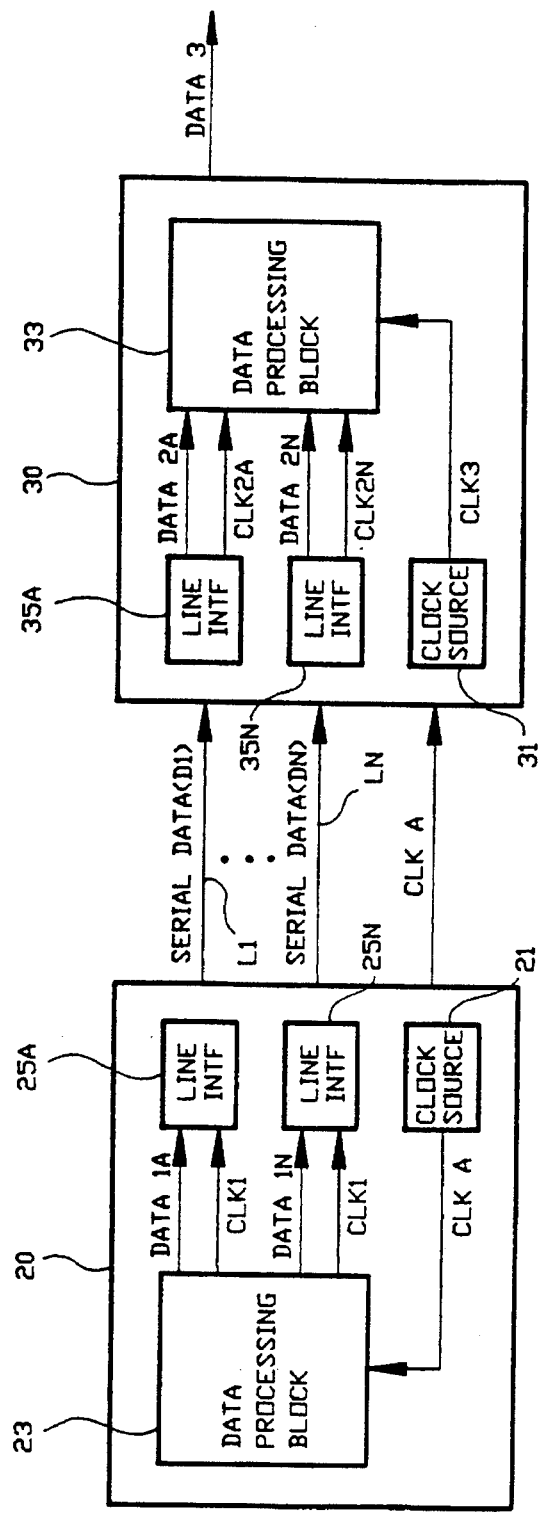
FIG. 2 is a schematic block diagram of a data transmission system to which the present invention is applied.

As shown in FIG. 2, a data transmission system of the present invention includes a transmitting station 20 synchronizing data at a clock to transmit the serial data and a receiving station 30 synchronizing and receiving the serial input data produced from the transmitting station 20. Each of the transmitting station 20 and receiving station 30 has data processing blocks 23 and 33, a plurality of outgoing line interfaces 25A to 25N and incoming line interfaces 35A to 35N.

In the meantime, a plurality of serial transmitting lines L1 to LN connected between the two stations 20 and 30 each may have a nominal variable length among them.

When multi-Channel data are transmitted or received between the transmitting station 20 and receiving station 30, a single clock source is to be used as reference clock, and thus, clock sources 21 and 31 serve as generators of reference clock in each of the transmitting station and receiving station.

The data processing block 23 of the transmitting station 20 processes data with the clock CLKA produced from the clock source 21, and transmits the data DATA1A to DATAIN and clock CLK1 to the incoming line interfaces 35A to 35N through transmitting lines L1 to LN via the outgoing interfaces 25A to 25N.

The outgoing line interfaces 25A to 25N transmit serial data D1 to DN that are synchronized to the clock source 21 to the receiving station 30 through the transmitting lines L1 to LN made of coaxial cable or twist pair copper wiring. The receiving station 30 extracts a clock from the serial data D1 to DN received to the incoming line interfaces 35A to 35N disposed on the front terminal and generates recovered data DATA2A to DATA2N and a clock CLK2. At this point, the incoming clocks CLK2A to CLK2N and data DATA2A to DATA2N are being mutually synchronized with the clock CLK1 and data DATA 1A to DATA1N of the transmitting station 20.

In other words, reference clock source 31 of the receiving station 30 receives the clock CLKA produced from the clock source 21 of the transmitting station 20 and generates reference clock CLK3 of the receiving station 30 to provide the reference clock CLK3 to the data processing block 33 so that there performs frequency synchronization between the outgoing clock CLK1 and incoming clocks CLK2A to CLK2N.

In this case, since the clocks CLK2A to CLK2N produced from the incoming line interfaces 35A to 35N are extracted in response to the serial data D1 and DN received via the transmitting lines L1 to LN different from each other in length, there are phase deviations between the clocks CLK2A to CLK2N.

Figure 3:
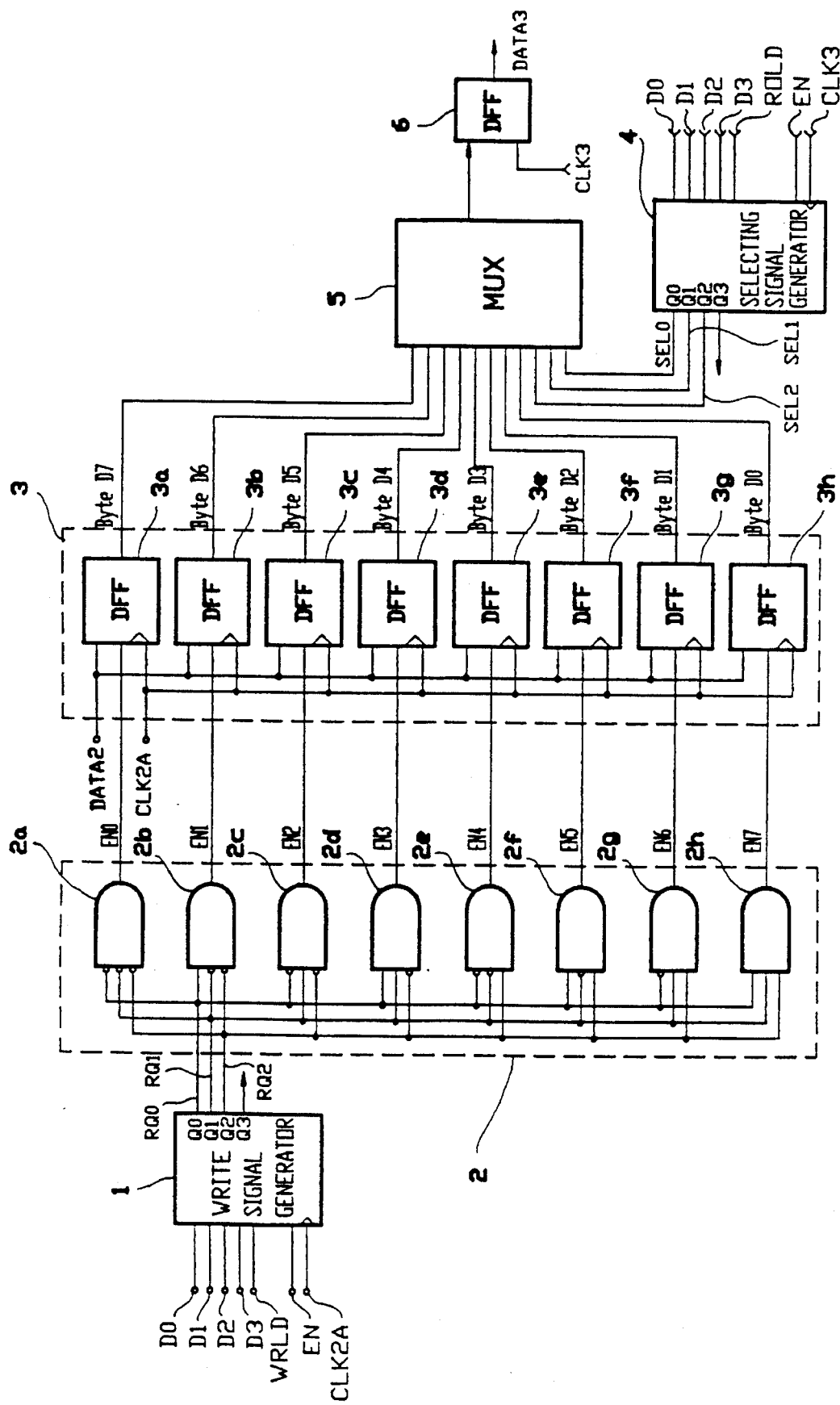
FIG. 3 is a circuit diagram of a clock synchronizing circuit of the data transmission system according to the present invention.

If the clocks CLK2A to CLK2N and data DATA2A to DATA2N produced from the incoming line interfaces 35A to 35N are applied to the data processing block 33 provided with the clock CLK3 of the clock source 31 that goes with outgoing clock CLK1 in frequency synchronization but is asynchronized therewith in phase, the clocks CLK2A to CLK 2N and system clock CLK3 should be synchronized. FIG. 3 shows a circuit employing an elastic buffer that can receive data without error by synchronizing the incoming clocks having mutual phase deviations at the system clock CLK3.

The inventive clock synchronizing circuit 37 which is a part of the data processing block 33 as shown in FIG. 5 is provided to each channel's first stage, and the data DATA2A to DATA2N and clocks CLK2A to CLK2N of each incoming line interfaces 35A to 35N are respectively applied to the clock synchronizing circuit 37 as input signals.

The clock synchronizing circuit shown in FIG. 3 will be described in case of being connected to next stage of the incoming first line interface 35A.

The clock synchronizing circuit includes a write signal generator 1 that counts clock CLK2A extracted from the line interface 35A on the basis of the serial data D1 transmitted from the transmitting station and generates a write signal RQ0 to RQ2; an enable signal generator 2 that performs a logical AND gate with the write signal produced from the write signal generator 1 and generates enable signals EN0 to EN7; a serial-parallel (S/P) converter 3 that latches by byte unit the incoming serial data DATA2A selectively enabled or disabled in response to the output signals of the enable signal generator 2 and converts the serial data into a parallel data Byte D0 to Byte D7; a selecting signal generator 4 that counts the system clock CLK3 to generate selecting signals SEL0 to SEL2; a multiplexer 5 that multiplexes the parallel data Byte D0 to Byte D7 latched in the S/P converter 3 in response to the output signals of the selecting signal generator 4 to produce the latched parallel data into serial data; and a D flip-flop that outputs the produced serial data in synchronization with the system clock CLK3 to generate the data DATA 3 without glitch.

The enable signal generator 2 includes a first AND gate 2a that performs a logical AND with inverted signals of first to third bit signals RQ0 to RQ2 among the output signals of the write signal generator 1; a second AND gate 2b that performs a logical AND with the first bit signal RQ0 and reverse signals of the second and third bit signals RQ1 and RQ2 among the output signals of the write signal generator 1; a third AND gate 2c that performs a logical AND with inverted signals of the first and third bit signals RQ0 and RQ2 and the second bit signal RQ1 among the output signals of the write signal generator 1; a fourth AND gate 2d that performs a logical AND with the first and second bit signals RQ0 to RQ1 and the inverted signal of the third bit signal RQ2 among the output signals of the write signal generator 1; a fifth AND gate 2e that performs a logical AND with inverted signals of the first and second bit signals RQ0 and RQ1 and a third bit signal RQ2 among the output signals of the write signal generator 1; a sixth AND gate 2f that performs a logical AND with the first and third signals RQ0 and RQ2 and the inverted signal of the second bit signal RQ1 among the output signals of the write signal generator 1; a seventh AND gate 2g that performs a logical AND with the inverted signal of the first bit signal RQ0 and the second and third bit signals RQ1 and RQ2 among the output signals of the write signal generator 1; and an eighth AND gate 2h that performs a logical AND with the first to third bit signals RQ0 to RQ2 among the output signals of the write signal generator 1.

Besides, the S/P converter 3 includes first to eighth D flip-flops 3a to 3h that are disabled or enabled in response to output signals EN0 to EN7 of the first to eighth AND gate 2a to 2h of the enable signal generator 2 to convert incoming serial date into parallel data.

The following description is about the operation of the clock synchronizing circuit.

The write signal generator 1 is composed of counters and counts the incoming clock CLK2A shown in FIG. 4A to generate the write signals RQ0 to RQ2. At this point, write load signal WRLD for the counter shown in FIG. 4B is formed by combining frame synchronizing information of incoming data with mask pulse.

The enable signal generator 2 performs a logical AND in the first to eighth AND gates 2a to 2h in response to the write signal RQ0 to RQ2 to generate the first to eighth enable signals. The first to eighth enable signals EN0 to EN7 enable selectively each of the first to eighth D flip-flops of the S/P converter 3 to latch the serial data DATA2A sequentially, as shown in FIG. 4B.

The first to eighth D flip-flops 3a to 3h convert the latched serial data DATA2A into parallel data Byte D7 to Byte D0 as shown in FIGS. 4D to 4K to input the parallel data to the multiplexer 5.

It means that clock speed of the above parallel data Byte D7 to Byte D0 lowers by ⅛ as compared with that of the original serial data and thus the parallel date Byte D7 to Byte D0 have eight times timing margin as much as that of the serial data.

The converted parallel data Byte D7 to Byte D0 are multiplexed to serial data using a new system clock CLK3 so that the clocks of the transmitting and receiving stations 20 and 30 having different phase deviations are synchronized.

The received data synchronized with the clock of the transmitting station 20 is converted into the one synchronized with the clock of the receiving station 30. The first to third selecting signals SEL0 to SEL2 are produced from the selecting signal generator 4 formed of four-bit UP counter by the system clock CLK3 to be provided as selection pulse to the multiplexer 5 having multiplex ratio of 8:1. The multiplexer 5 multiplexes sequentially the input parallel data Byte D7 to Byte D0 to the serial data and produce them. The serial data DATA3, output of the multiplexer 5, is synchronized with the system clock CLK3 and input to the D flip-flop 6 at next stage.

The following should be noted when it comes to synchronize clocks in the inventive clock synchronizing circuit.

First, when the serial data is converted into parallel data, eight D flip-flops are used in the above embodiment, and the number of the using buffer is adjustable according to the usage of the elastic buffer, and the size of the buffer depends on the capacity of the elastic buffer. What should be secondly noted is about the load of the write/read counters forming each of the write signal generator 1 and selecting signal generator 4.

Once the two counters start counting optionally, it cannot guarantee that the read counter 4 reads out at the center the data increased to 8 by the write counter 1 as shown in FIG. 4. Accordingly, a predetermined information should become a reference when it comes to loading the two counters.

For example, in synchronous optical network (SONET) frame, starting is determined by means of frame bytes A1 and A2, and according to this, a method for performing the load of the write and read counters in a standing rule can be selected.

In other words, in SONET frame, the write counter 1 is loaded by masking mask pulse formed by incoming clock at the frame bytes A1 and A2. Such a mask pulse can prevent the possibility of there being any pattern similar to those of A1 and A2 in the bit stream of the data information. With using the elastic buffer, the incoming clocks having various phases are synchronized with the system clock of the receiving station, and the incoming serial data may be converted to various parallel data modes.

That is, according to the present invention, the data may be converted into 2 bit, 4 bit or 8 bit signal by adjustment of the read clock, i.e., system clock CLK3 at the read stage of the elastic buffer, and in order to do this, the data is latched in frame unit.

As mentioned above in detail, the present invention is capable of synchronizing the data transmitted from the transmitting station with a clock of the receiving station using the elastic buffer at the time of data transmission between two data transmission systems distant from each other and having phase deviations. The buffer amount and capacity of the elastic buffer may be adjusted according to its use, and setting load timing of the write/read counters may be facilitated by means of frame information.

While this invention has been described in terms of a single preferred embodiment, those skilled in the art will recognize that the invention can be practiced with modification within the spirit and scope of the appended claims.

What is claimed is:

1. A clock synchronizing circuit of a data transmission system for synchronizing a serial input data at an input clock with a new system clock at each channel of a receiving station to produce a serial output data when transmitting multi-channel data using transmitting lines different from each other in length between data transmission systems distant from each other, the combination of the circuit including:

first means for counting the input clock provided from a transmitting station to generate write signals of plural bits;

second means for performing a logical AND with the write signals of plural bits generated from said first means to produce a plurality of enable signals;

third means for converting the serial input data into parallel data in response to the plurality of enable signals of said second means and the input clock;

fourth means for counting said system clock to generate selecting signals of plural bits;

fifth means for multiplexing the parallel data provided from said third means in response to the selecting signals to produce the serial output data; and D flip-flop for synchronizing the serial output data produced from said fifth means to said system clock to output the serial output data without glitch.

2. The circuit according to claim 1, wherein said second means includes:

a first AND gate that performs a logical AND with inverted signals of first to third bit signals among the write signals of the first means;

a second AND gate that performs a logical AND with the first bit signal and inverted signals of the second and third bit signals among the write signals of the first means;

a third AND gate that performs a logical AND with inverted signals of the first and third bit signals and the second bit signal among the write signals of the first means;

a fourth AND gate that performs a logical AND with the first and second bit signals and the inverted signal of the third bit signal among the write signals of the first means;

a fifth AND gate that performs a logical AND with inverted signals of the first and second bit signals and a third bit signal among the write signals of the first means;

a sixth AND gate that performs a logical AND with the first and third signals and the inverted signal of the second bit signal among the write signals of the first means;

a seventh AND gate that performs a logical AND with the inverted signal of the first bit signal and the second and third bit signals among the write signals of the first means; and an eighth AND gate that performs a logical AND with the first to third bit signals among the write signals of the first means.

3. The circuit according to claim 1, wherein said third means includes a plurality of first to eighth flip-flops that latch by byte unit said input serial data enabled or disabled in response to said plurality of enable signals of said second means.

4. The circuit according to claim 1, wherein said first means comprises a counter, and write load signal of said counter is formed by combining a frame synchronizing information of the received input data with a mask pulse.

5. The circuit according to claim 1, wherein said fourth means comprises a counter, and a loading of the counter is performed so as to read out at the center of the data latched in said third means.

\* \* \* \* \*